United States Patent
Skehan

[15] 3,665,282
[45] May 23, 1972

[54] SCAN CONTROL SYSTEM
[72] Inventor: Bernard J. Skehan, Manhattan Beach, Calif.
[73] Assignee: Hughes Aircraft Company, Culver City, Calif.
[22] Filed: July 24, 1969
[21] Appl. No.: 846,302

[52] U.S. Cl. ..........................................318/627
[51] Int. Cl. ..........................................G05g 5/00
[58] Field of Search..........................318/626, 627

[56] References Cited

UNITED STATES PATENTS

| | | | |
|---|---|---|---|
| 2,776,396 | 1/1957 | Gille et al. | 318/627 |
| 2,826,726 | 3/1958 | Mitchell | 318/627 |
| 3,403,310 | 9/1968 | Davidoff | 318/626 |
| 3,440,505 | 4/1969 | Nielsen | 318/627 |

Primary Examiner—Benjamin Dobeck
Attorney—James K. Haskell and Walter J. Adam

[57] ABSTRACT

A system for accurately reciprocally driving a structural element, such as a flat reflector. The system includes a torque motor for driving the reflector, a position pick-off device for monitoring the position of the reflector, and an electronic unit comprising feedback paths coupling the pick-off device to the torque motor. The electronic unit includes a negative feedback positioning loop enclosed within an outer positive feedback hysteresis loop. The positioning loop comprises a type II (double integration) loop which yields a zero position error for a constant scan rate (angular velocity) input. The outer positive feedback loop functions to produce a precise triangular waveform (scan rate input) whose turn around points are precisely maintained in order to prevent drift of the scan angle center point position. The system enables different scan angles (e.g., wide and narrow) to be selected by varying scan frequency while maintaining scan rate constant.

13 Claims, 3 Drawing Figures

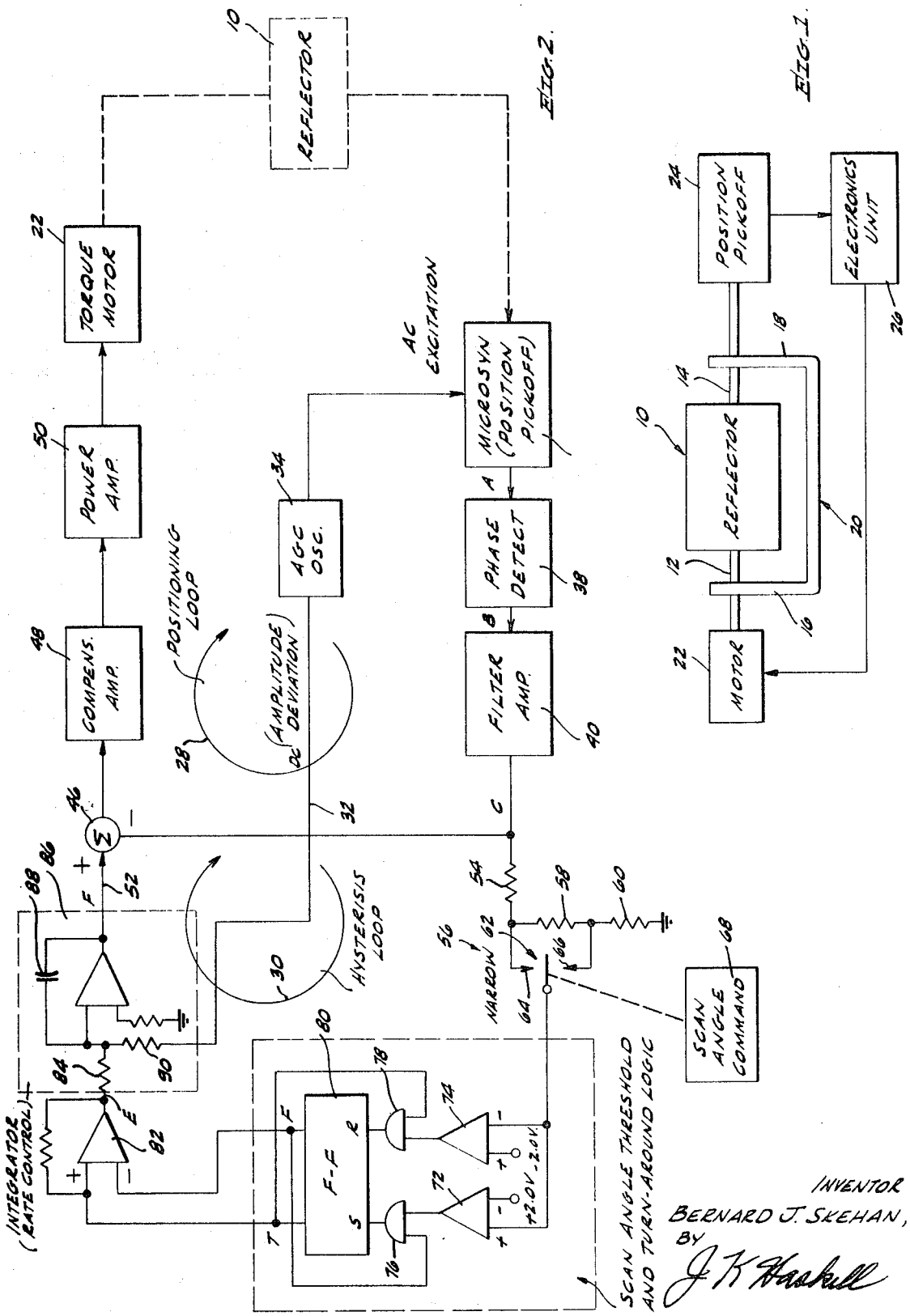

SCAN CONTROL SYSTEM

BACKGROUND OF THE INVENTION

1. Field of the Invention

This invention relates generally to a system for accurately reciprocally driving a structural element, and more particularly, to a system suitable for use in high accuracy applications for precisely controlling the amplitude, frequency, and rate of scanning of an energy reflector such as a mirror.

2. Description of the Prior Art

Many applications exist which require the reciprocal driving of an energy reflector in order, for example, to scan incident energy across a matrix of detectors. Most prior art systems for driving such a reflector have employed some type of mechanical oscillator or cam arrangement. Although such mechanical arrangements are well suited for relatively low accuracy applications, they generally do not have the amplitude, frequency, and rate stability required for extremely high accuracy applications. Moreover, known mechanical arrangements are incapable of accurately switching scan frequency while maintaining scan rate constant without introducing a large transient overshoot.

An object of the present invention is to provide a system for accurately and repeatably reciprocally driving a structural element.

It is a more particular object of the present invention to provide a scanning system for a reflector which precisely controls the scan amplitude, frequency and rate.

It is still a more particular object of the present invention to provide a scanning system for a reflector which enables the scanned frequency to be selectively changed while maintaining a constant scan rate.

SUMMARY OF THE INVENTION

Briefly, in accordance with the present invention, a scanning system is provided including a negative feedback positioning loop incorporating the reflector. A triangular waveform constant scan rate input signal for driving the positioning loop is developed by a positive feedback hysterisis loop incorporating the positioning loop. The positioning loop is a type II servo-loop, meaning that it incorporates two steps of integration and is characterized by providing a zero positioning error for a constant scan rate input. Thus, the positioning loop alone can function to precisely position the reflector in response to a constant scan rate input signal. The hysterisis loop functions to produce the constant scan rate input signal so as to prevent drifting of the scan angle center point.

In accordance with the preferred embodiment of the invention, a direct drive brushless torque motor is used to drive the reflector. The motor has the characteristic that it exhibits a constant acceleration in response to a constant current input. Thus, double integration is achieved by current driving the motor in response to a constant scan rate input signal.

In accordance with the preferred embodiment of the invention, a brushless microsyn signal generator is used as the position pick-off device. The microsyn is excited by a controlled AC signal and produces a voltage output proportional to angular deviation. In accordance with a significant feature of the preferred embodiment of the invention, a DC signal, proportional to the amplitude deviation of the microsyn excitation signal, is developed and fed into a rate control integrator to compensate for resulting deviations in the microsyn output.

Scan rate is established by an integrator within the hysterisis loop comprised of very close tolerance components. In response to a constant positive input to the integrator, the integrator provides a linearly increasing output signal at a rate determined by the fixed characteristics of the integrator. In response to a constant negative input signal, the integrator provides a linearly decreasing output signal at the same rate. Thus, the integrator provides the triangular waveform to drive the positioning loop. The frequency of this waveform is, of course, determined by the intervals of positive and negative input signals applied to the integrator. The duration of these intervals is established by a logic network which continually compares the phase detected output of the microsyn generator with fixed positive and negative threshold levels. As the reflector scans in one direction, the microsyn generator output signal increases and likewise the integrator output signal increases. When the phase detected microsyn output signal reaches the positive threshold level, the signal input to the integrator is reversed to then start to drive the motor in the opposite direction. The microsyn generator output signal then decreases and when it reaches the negative threshold level, the input to the integrator is reversed to thus also reverse the direction of motor drive.

In accordance with a further significant feature of the invention, a particular scan frequency is established by appropriately attenuating the phase detected microsyn output signal prior to comparing it with the afore-mentioned positive and negative threshold levels.

BRIEF DESCRIPTION OF THE DRAWINGS

FIG. 1 is a general block diagram of a system embodying the present invention;

FIG. 2 is a more detailed block schematic diagram of a system embodying the present invention.

DESCRIPTION OF THE PREFERRED EMBODIMENTS

Figure 3:
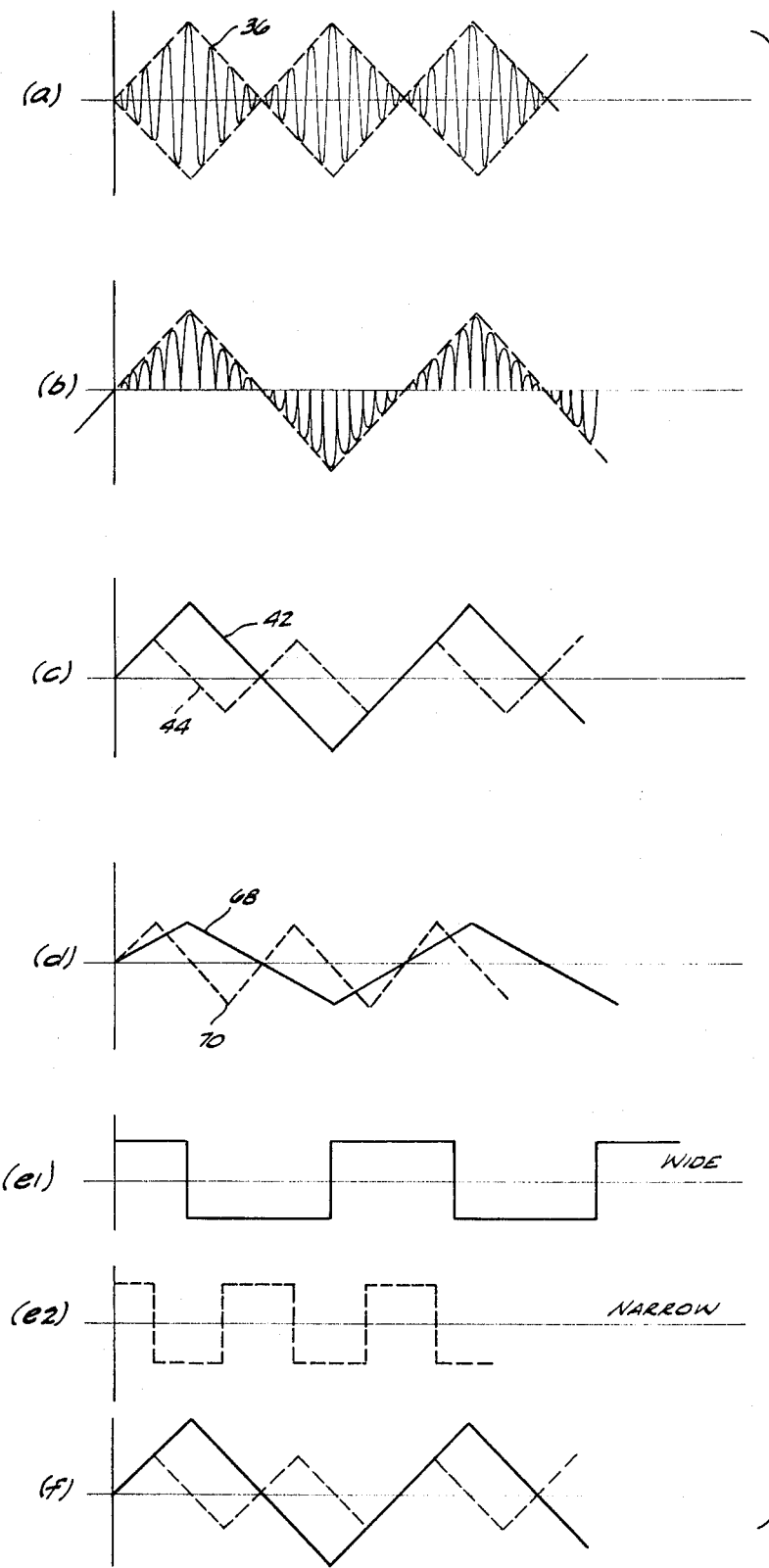
FIG. 3 is a waveform chart illustrating signals occurring at various points in the system of FIG. 2.

Attention is now called to FIG. 1 of the drawing which illustrates very generally, a system embodying the present invention. Although systems in accordance with the present invention will find many applications, a very significant application is for the purpose of reciprocally driving an energy reflector such as a mirror 10. As shown in FIG. 1, the mirror 10 can be mounted on spindles 12 and 14 respectively journaled for rotation in arms 16 and 18 of a U-shaped frame 20. The spindle 12 is coupled to the drive shaft of a motor 22. The spindle 14 is coupled to the rotor of a position pick-off device 24. An electronic unit 26 in accordance with the invention is responsive to the output of the position pick-off device 24 for controlling the energization of the motor 22.

As previously pointed out, the electronic unit 26 in accordance with the invention functions to precisely control the scanning amplitude, frequency and rate of the motor 22. Scanning amplitude refers to the angle scanned by the drive shaft of motor 22. Scanning frequency refers to the scanning repetitions of the motor drive shaft per unit time interval. Scanning rate refers to the angular velocity of the motor drive shaft.

In accordance with a preferred embodiment of the invention, the motor 22 comprises a direct drive brushless torque motor such as Aeroflex model TQ 10W-6H. Quantitative characteristics of this motor are set forth in appended Table 1. Significantly, the motor 22 is a torque motor and thus exhibits a constant acceleration in response to a constant current input. As a consequence, the motor introduces a double integration when current driven. As will be seen hereinafter, this double integration is used in the implementation of a type II servo-loop.

The position pick-off device 24 preferably comprises a microsyn signal generator. An appropriate microsyn signal generator is commercially available as U. S. Time model no. 202940-0 N/C. The characteristics of this microsyn signal generator are set forth in appended Table 2.

As is well known, a microsyn signal generator is a rotary differential transformer which produces a signal proportional to the difference between two induced voltages. It can be made to have a very accurate voltage vs. angle characteristic. The theory of microsyn signal generator operation is discussed on page 542 of the text entitled, "ANALYSIS AND DESIGN OF FEEDBACK CONTROL SYSTEMS," Thaler and Brown, McGraw-Hill, Second edition.

Attention is now called to FIG. 2 of the drawing which illustrates the components of a preferred embodiment of electronic unit 26 for coupling the microsyn position pick-off device 24 to the torque motor 22. In accordance with the present invention, the components of the electronic unit 26 form an inner negative feedback positioning loop 28 and an outer positive feedback hysterisis loop 30 incorporating the positioning loop 28. In addition, in accordance with the preferred embodiment of the invention, a feedback path 32 is provided to compensate for variations in the amplitude of the AC microsyn excitation signal.

In accordance with the present invention, the positioning loop 28 is implemented so as to constitute what is commonly referred to as a type II servo-loop. A type II servo-loop includes two stages of integration and is characterized by having a zero positioning error for a constant scan rate (angular velocity) input. Type II servo-loops are discussed at length in various text books dealing with servo mechanisms. For example, see page 212 of the text, "SERVO MECHANISMS AND REGULATING SYSTEM DESIGN," Chestnut and Mayer, Wiley, Volume I. In accordance with the preferred embodiment of the present invention, the two steps of integration required to achieve a type II servo-loop are obtained by current driving the torque motor 22. As was previously pointed out, the torque motor 22 exhibits a double integration characteristic inasmuch as a constant current input thereto yields a constant acceleration output.

As noted, the positioning loop 28 includes the torque motor 22, the driven reflector 10 and the microsyn position pick-off device 24. The microsyn device 24 is excited by an AC current provided by an oscillator 34, preferably including automatic gain control (AGC). Under steady state scanning conditions, the microsyn position pick-off device 24 will provide a high frequency output signal as shown in line (a) of FIG. 3, whose envelope as shown by dotted lines 36 constitutes a pair of triangular waveforms 180° out of phase with one another. The microsyn device output signal is applied to the input of a phase detector 38 which in turn provides the output signal illustrated in line (b) of FIG. 3. The output signal of the phase detector 38 is then applied to a filter amplifier 40 which in turn provides a signal 42 corresponding to the envelope of the output signal of the phase detector 38. The output of the filter amplifier 40 is illustrated in line (c) of FIG. 3. It is pointed out that whereas the signals illustrated in lines (a) and (b) of FIG. 3 correspond only to those characteristic of a wide angle scan, line (c) of FIG. 3 shows in solid lines 42 the signal at point C of FIG. 2 characteristic of a wide angle scan and in dotted line form the signal 44 at point C at FIG. 2 characteristic of a narrow angle scan. The output of the filter amplifier 40 is applied to a summing junction 46 whose output is in turn coupled to the input of a compensation amplifier 48. The output of the compensation amplifier 48 is coupled to the input of a power amplifier 50 which provides a current output in response to a voltage input to thus current drive the torque motor 22 to achieve the afore-mentioned double integration effect.

Assuming for the moment the application of a precise triangular waveform to input terminal 52 of summing junction 46, the positioning loop alone can function to precisely position the reflector. As will be seen hereinafter, the hysterisis loop 30 functions to produce the precise triangular waveform applied to summing junction input terminal 52 so as to prevent drifting of the scan angle center point.

Prior to proceeding to a discussion of the details of the hysterisis loop 30, it is pointed out that type II servo-loops are inherently unstable and accordingly it is necessary to include compensation within the loop 28 in order to prevent oscillation. The function of the compensation amplifier 48 is to introduce phase lead in order to compensate for the phase lag introduced by the filter amplifier 40. The compensation amplifier 48 will provide a voltage output signal in response to a voltage input signal and will introduce, in accordance with well known servo theory, whatever compensation is necessary to stabilize the loop 28. As previously pointed out, in response to the voltage output of the compensation amplifier 48 the power amplifier 50 will develop a current signal for driving the torque motor 22.

The output of the filter amplifier 40 (line (c) in FIG. 3) is coupled through a resistor 54 to an attenuation network 56. The attenuation network 56 includes resistors 58 and 60 connected in series between resistor 54 and ground. The attenuation network 56 includes a single poled double throw switch 62. The switch contact 64, used for narrow angle scans, is connected to the junction between resistors 54 and 58. The switch contact 66, used for wide angle scans, is connected to the junction between resistors 58 and 60. The pole of switch 62 is controlled by a scan angle command device 68 which moves the pole into engagement with contact 66 to produce a wide angle scan and into engagement with contact 64 to produce a narrow angle scan. It will be appreciated that when the pole of switch 62 contacts switch contact 64, the full potential available at the junction between resistors 54 and 58 will be coupled through to the switch pole. On the other hand, when the switch pole contacts switch contact 66, a lesser voltage available at the junction between resistors 58 and 60 will be coupled through to the pole. Thus, as will be better appreciated hereinafter, the output signal provided by the filter amplifier 40 will reach the positive and negative threshold levels to be discussed sooner when the switch 62 is in the narrow scan angle position. This means that the scan frequency will be greater and the scan angle narrower than when the switch 62 is in the wide scan angle position.

Line (d) of FIG. 3 shows the potential available on the pole of switch 62 for both the wide angle scan represented by the waveform 68 and the narrow angle scan represented by the waveform 70. It will be noted that the peak amplitude of the waveforms 68 and 70 has been scaled by the attenuator network 56 so as to be equal. However, as will be apparent, the scan frequencies are different.

The pole of switch 62 is connected to the positive input terminal of differential amplifier 72 and to the negative input terminal of differential amplifier 74. The negative input terminal of differential amplifier 72 is connected to a positive reference voltage source, e.g., plus 2.0 volts. The positive input terminal of differential amplifier 74 is connected to a reference potential shown as −2.0 volts. It will be appreciated that when the signal available on the pole of switch 62 exceeds +2.0 volts, that differential amplifier 72 will provide an enabling output signal. On the other hand, when the potential on the pole of switch 62 decreases past −2.0 volts, differential amplifier 74 will provide an enabling output signal. The output terminals and amplifiers 72 and 74 are respectively connected to AND gates 76 and 78 which are connected to first and second input terminals of a flip-flop 80. Assuming that AND gate 76 is connected to the set input terminal flip-flop 80, then the false output terminal thereof is connected back to the input of AND gate 76. The output of AND gate 78 will be connected to the reset input terminal of flip-flop 80 and the true output terminal will be connected to the input of gate 78.

As a consequence of the afore-described configuration, the flip-flop 80 will toggle back and forth between states as the signal applied to the pole of switch 62 increases to +2.0 volts and decreases to −2.0 volts. The output terminals of flip-flop 80 are connected to an operational amplifier 82 which provides either a positive or negative output signal level. Line (e1) of FIG. 3 illustrates the output of amplifier 82 for a wide angle scan and line (e2) of FIG. 3 illustrates the output of amplifier 82 for a narrow angle scan.

The output of amplifier 82 is connected through a resistor 84 to one input terminal of an integrator 86 which preferably comprises an operational amplifier having a capacitor feedback loop 88. When amplifier 82 provides a positive output signal level, integrator 86 provides a linearly increasing output signal whose slope is defined by the inherent time constant built into the amplifier 86. Similarly, when amplifier 82 provides a negative output signal level, the integrator 86 will provide a linearly decreasing output signal. The charging and discharging time constants of the integrator 86 are selected to be equal and are defined by the close tolerance components contained therein. For steady state conditions, the output signal provided by the integrator 86, shown in line (f) of FIG. 3, will be identical to that available at point C of FIG. 2, i.e., at the output of the filter amplifier 40. In other words, under steady state operating conditions, the summing junction 46 will provide no error to the compensation amplifier 48.

From the foregoing, it should be recognized that the negative positioning loop 28 will accurately control the position of the reflector 10 while the positive hysterisis loop 30, including the positioning loop 28 will prevent any offset drift which would change the scan angle center point. That is, by incorporating the negative feedback positioning loop 28 within the positive feedback hysterisis loop 30, the positive feedback loop is responding to and maintaining the actual turn around positions of the reflector and not merely to the condition of the integrator 86. Thus, by sensing and controlling the actual reflector position, error build up is prevented and an exceedingly high accuracy system is achieved.

The feedback path 32 has previously been mentioned. This path 32 is incorporated in order to compensate for any amplitude deviations in the output of the oscillator 34. More particularly, if the amplitude of the oscillator output increased, the DC amplitude of the microsyn output signal would also increase which would then produce a faster scanning frequency. In order to prevent this, a DC signal is developed proportional to the amplitude deviation of the output of the oscillator 34 and is coupled through resistor 90 to the input of integrator 86. The DC signal proportional to amplitude deviation is normally available from the automatic gain control portion of the oscillator 34.

From the foregoing, it will be recognized that a scan control system has been disclosed herein for precisely controlling the scanning amplitude, frequency, and rate of a structural element such as a reflector. Extreme accuracy has been achieved primarily as a consequence of employing a type II negative feedback positioning servo-loop enclosed within a positive feedback hysterisis loop producing a constant scan rate signal of fixed slope determined by the fixed characteristics of an integrator.

TABLE I

Torque Motor Characteristics Aeroflex Model TQ 10W–6H

| | |
|---|---|
| 1. Continuous Torque | 1.0 in oz. |
| 2. Peak Torque | 4.0 in oz. |
| 3. Power Input at 25° C. | 4.0 watts |
| 4. Resistance | 120 ohms |
| 5. Sensitivity | 5.6 in oz./amp. |
| 6. Electrical Time Constant (L/R) | $2.0 \times 10^{-4}$ sec. |
| 7. Back Emf | 40 mv./Rad/Sec. |
| 8. Rotor Inertia | $40 \times 10^{-6}$ in oz. sec.$^2$ |
| 9. Viscous Damping | |
| Infinite Source Imp. | $4. \times 10^{-3}$ in oz./Rad/Sec. |
| Zero Source Imp. | $1.8 \times 10^{-3}$ in oz./Rad/Sec. |
| 10. Friction | None |
| 11. Ripple Torque | None |
| 12. Weight | 2.0 oz |

TABLE II

Microsyn Characteristics U.S. Time No. 202940–0 N/C

| | |
|---|---|
| 1. Input Voltage | 26 Vrms, 4.8 kHz. |
| 2. Input Current | 220 ma, max |
| 3. Power Factor | 0.14 min |
| 4. Sensitivity | 12.0 Vrms/Deg, ± 5% |
| 5. Output Load | 10K ohms |
| 6. Output Null | 50 mVrms, max |
| 7. Phase Shift | −5° ± 5% |

What is claimed is:

1. A system for reciprocally driving a member at a constant rate through a precisely defined scan angle, said system comprising:

a motor having a drive shaft coupled to said member;

type II feedback loop means, including said motor and a summing junction, for driving said member as a function of the difference of two signals applied to said summing junction, said type II feedback loop means, including means for performing a double integration of said difference signal;

means for coupling a feedback signal to said summing junction indicative of the actual angular position of said motor drive shaft;

hysteresis loop means responsive to said feedback signal for producing a reference signal of triangular waveform; and means for applying said reference signal to said summing junction.

2. The system of claim 1 wherein said means for coupling a feedback signal to said summing junction includes a position pick-off means providing a high frequency output signal having an envelope whose amplitude is proportional to the actual angular position of said motor drive shaft; and means responsive to said position pick-off means for producing a signal corresponding to said envelope.

3. The system of claim 2 wherein said hysterisis loop means includes a logic means responsive to said signal produced by said pick-off means, for developing time duration signals of either first or second levels indicative of the duration said motor drive shaft is to either side of the center point of said scan angle; and integrator means responsive to said logic means for producing said reference signal comprised of linearly increasing segments during intervals said signal produced by said logic means is at a first level and linearly decreasing segments during intervals said signal produced by said logic means is at a second level.

4. The system of claim 3 including oscillator means providing an AC excitation signal to said pick-off means; and means responsive to deviations in the amplitude of said excitation signal for controlling said integrator means.

5. The system of claim 1 wherein said means for coupling a feedback signal comprises a microsyn signal generator providing a high frequency output signal having an envelope whose amplitude is proportional to the actual angular position of said motor drive shaft; and means responsive to said output signal for producing a signal corresponding to said envelope.

6. The system of claim 5 wherein said hysteresis loop means includes a logic means responsive to said envelope signal, for developing time duration signals of either first or second levels indicative of the duration said member is to either side of the center point of said scan angle; and integrator means responsive to said logic means for producing said reference signal comprised of linearly increasing segments during intervals said signal produced by said logic means is at a first level and linearly decreasing segments during intervals said signal produced by said logic means is at a second level.

7. The system of claim 6 including oscillator means providing an AC excitation signal to said microsyn signal generator; and means responsive to deviations in the amplitude of said excitation signal for controlling said integrator means.

8. A system for reciprocally driving a reflector at a constant rate through a precisely defined scan angle, said system comprising:

a motor having a drive shaft and exhibiting a constant acceleration output in response to a constant current input;

a pick-off device for producing a signal whose amplitude is related to the actual position of said motor drive shaft;

logic means responsive to said signal produced by said pick-off device for developing time duration signals of either first or second levels indicative of the duration said motor drive shaft is to either side of the center point of said scan angle;

integrator means responsive to said logic means for producing a reference signal comprised of linearly increasing segments during intervals said signal produced by said logic means is at a first level and linearly decreasing segments during intervals said signal produced by said logic means is at a second level; and means responsive to the difference between said signals produced by said pick-off device and said integrator means for driving said motor.

9. The system of claim 8 wherein said logic means includes first and second differential amplifiers each having positive and negative input terminals;

means applying a positive threshold signal to said negative input terminal of said first differential amplifier;

means applying a negative threshold signal to said positive input terminal of said second differential amplifier; and means applying said signal produced by said pick-off device to said positive and negative input terminals respectively of said first and second differential amplifiers.

10. The system of claim 9 including a flip-flop;

means coupling said first and second differential amplifiers to said flip-flop for switching said flip-flop when said signal produced by said pick-off device increases to the level of said first threshold signal or decreases to the level of said second threshold signal; and means coupling said flip-flop to said integrator means.

11. The system of claim 8 wherein said logic means includes means for comparing said signal produced by said pick-off device with first and second threshold levels.

12. The system of Claim 11 including first and second attenuation paths;

a scan angle command means; and means responsive to said scan angle command means for selectively coupling either said first or second attenuation paths between said pick-off device and said logic means.

13. The system of claim 1 wherein said motor is a torque motor characterized by a constant acceleration output in response to a constant current input.

* * * * *